United States Patent [19]

Squires et al.

[11] Patent Number: 5,388,202
[45] Date of Patent: Feb. 7, 1995

[54] METHOD AND APPARATUS FOR GENERATING WINDOW BORDERS HAVING PICTORIAL FRAME ELEMENTS

[75] Inventors: Todd M. Squires, Wheeling; Michael J. Manning, Des Plaines; David S. Feldman, Buffalo Grove, all of Ill.

[73] Assignee: Viacom International Inc., New York, N.Y.

[21] Appl. No.: 103,834

[22] Filed: Aug. 9, 1993

Related U.S. Application Data

[63] Continuation of Ser. No. 474,357, Feb. 2, 1990, abandoned.

[51] Int. Cl.$^6$ ............................................. G06F 15/62
[52] U.S. Cl. ................................................. 395/157
[58] Field of Search ........................ 395/119, 125–126, 395/128, 141, 133, 139, 135, 134, 150–161; 382/47; 340/709–710, 703, 706, 721, 722, 723, 747; 358/183; 345/119–120

[56] References Cited

U.S. PATENT DOCUMENTS

| | | | |
|---|---|---|---|
| 4,692,858 | 9/1987 | Redford et al. | 395/157 |
| 4,710,761 | 12/1987 | Kapur et al. | 340/721 |
| 4,712,191 | 12/1987 | Penna | 395/159 |
| 4,769,636 | 9/1988 | Iwami et al. | 395/158 |
| 4,814,884 | 3/1989 | Johnson et al. | 358/183 |
| 4,819,192 | 4/1989 | Kuragano et al. | 395/126 X |
| 4,831,556 | 5/1989 | Oono | 395/157 |
| 4,899,136 | 2/1990 | Beard et al. | 395/157 |
| 4,951,229 | 8/1990 | DiNicola | 345/152 |
| 5,001,697 | 3/1991 | Torres | 395/157 X |
| 5,003,499 | 3/1991 | Fujiwara et al. | 395/156 X |
| 5,093,907 | 3/1992 | Hwong et al. | 395/152 |

OTHER PUBLICATIONS

Macintosh System Software User's Guide, V. 6.0, 1988, pp. 14–25.
Myers, "Window Interfaces", IEEE Comp. Graphics and Appl., Sep. 1988, pp. 65–84.
Microsoft Paintbrush, Microsoft Corp., 1986, pp. 11–19.
Microsoft Windows User's Guide, Microsoft Corp., 1987, pp. 148–150.
Smith, "Building Interfaces Interactively", Proceedings of ACM, Oct. 19, 1988, pp. 144–151.

*Primary Examiner*—Heather R. Herndon
*Assistant Examiner*—John E. Breene
*Attorney, Agent, or Firm*—Pennie & Edmonds

[57] ABSTRACT

A method and apparatus for generating realistic window borders of windows of a range of sizes for display on a display screen in a windowing environment. Realistic window borders with simulated 3-D characteristics and the appearance of real structures and materials such as wood, stone, etc., are provided within a windowing display environment by first generating and inputting realistic pictorial frame elements, sizing the realistic frame elements in accordance with the desired size of the window and generating location information for each element based upon the desired size of the window. The sized frame elements are then assembled using the location information and displayed on the screen of the system display device.

13 Claims, 8 Drawing Sheets

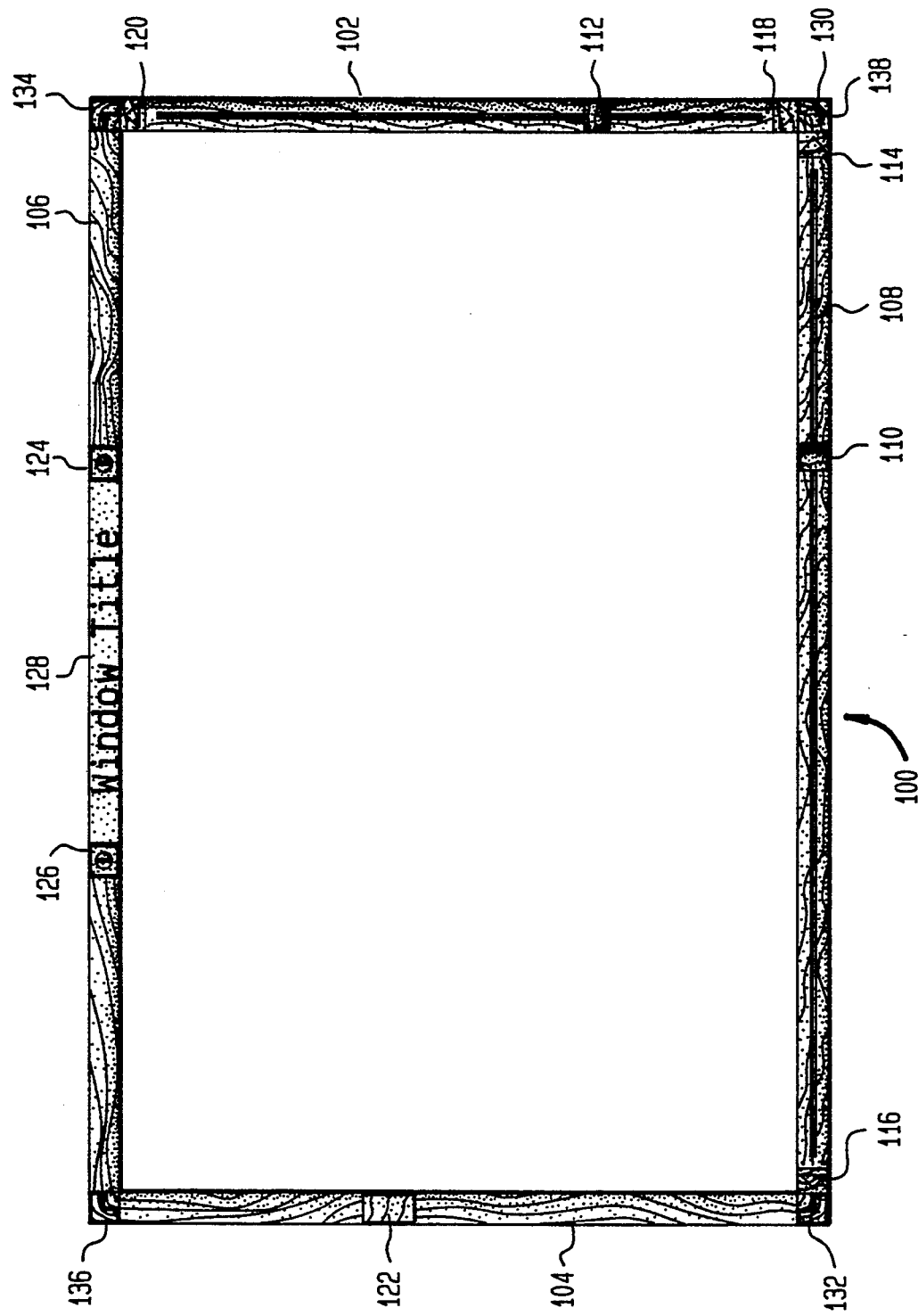

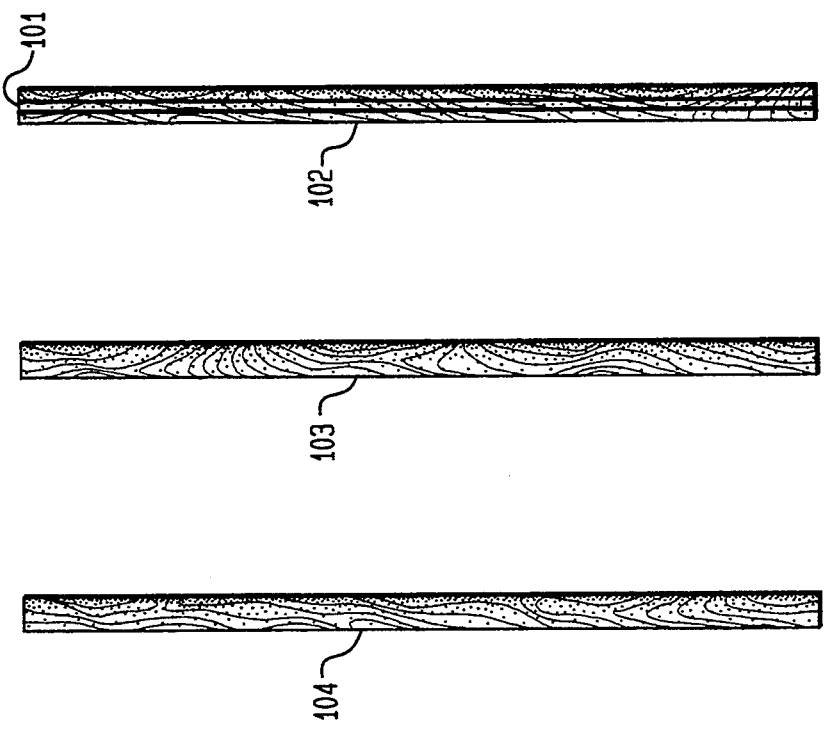

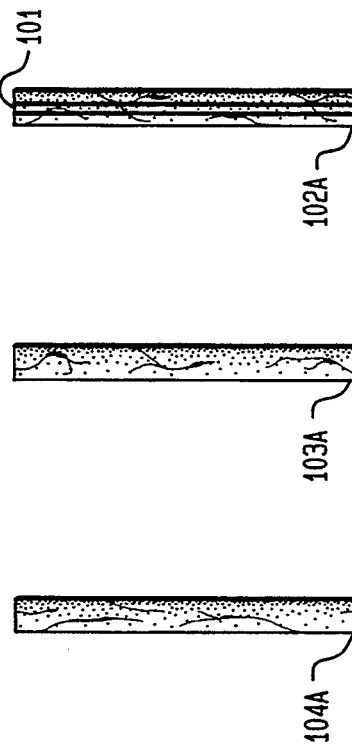

FIG. 5P  124A
FIG. 5T  132A
FIG. 5V  136A
FIG. 5Q  126A
FIG. 5U  134A
FIG. 5S  130A
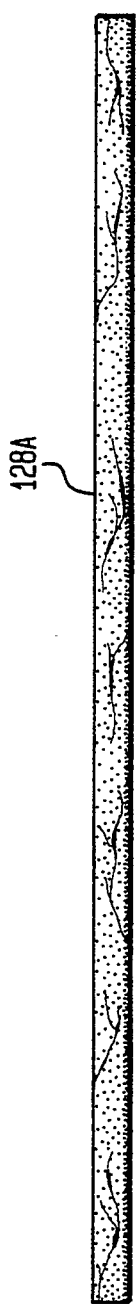
128A
FIG. 5R
107A
FIG. 5B FIG. 6A
FIG. 6B
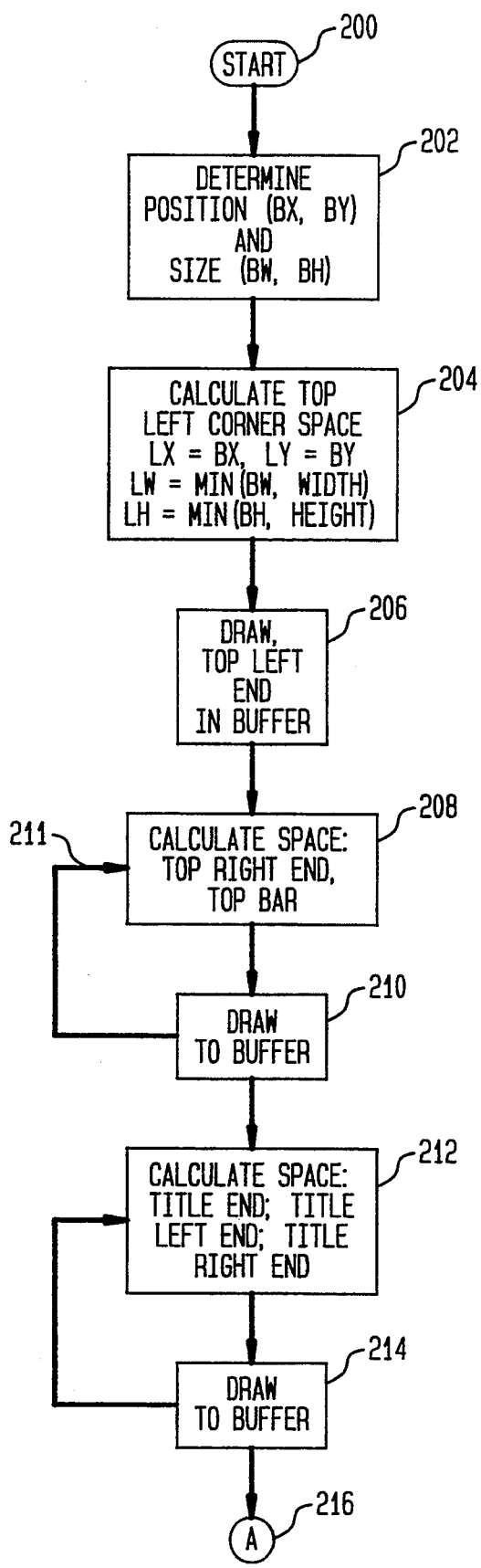
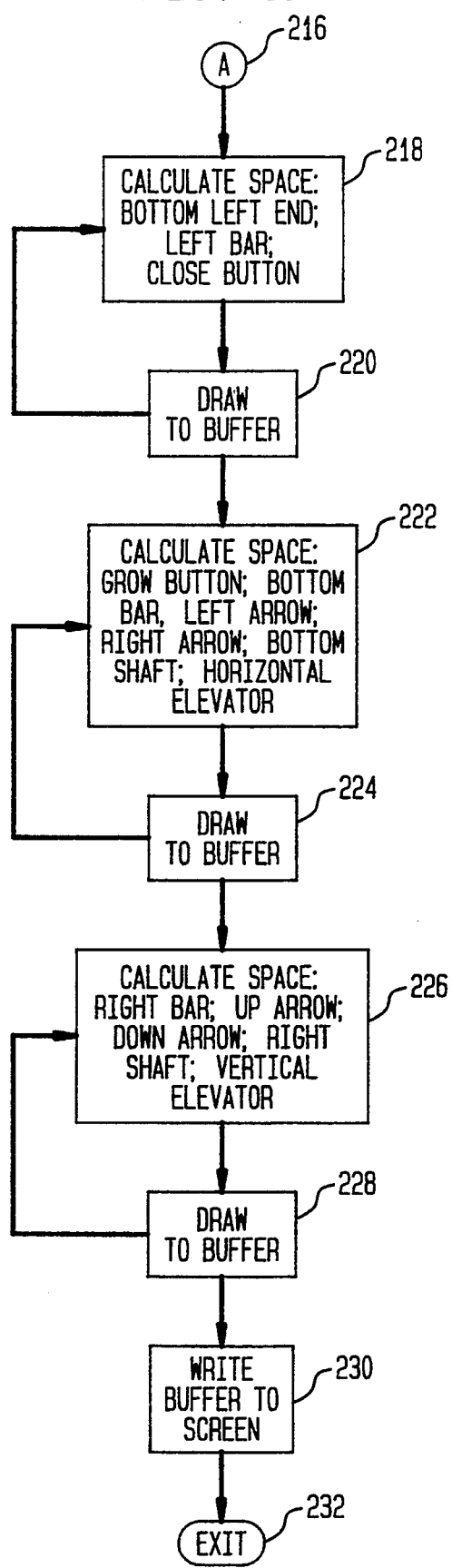

METHOD AND APPARATUS FOR GENERATING WINDOW BORDERS HAVING PICTORIAL FRAME ELEMENTS

This is a continuation of application Ser. No. 07/474,357, filed Feb. 2, 1990, now abandoned.

This invention relates generally to the field of graphical information displays and particularly to realistic window borders suitable for a computer display system in which a multi-window display environment is used for displaying information in the form of separate or overlapping windows on a display screen.

Windowing is a feature that has recently gained wide usage in the field of graphical workstations, personal computers, etc. This has largely been due to the extensive attention paid to improving the user interface in an effort to create an operating environment that is easy and efficient to use. The use of a multi-window graphics interface is one approach in modern computing to creating a "desktop" metaphor interface. Recent developments in multi-media technology are accelerating the trend towards windowing environments.

A window is a viewing area on a video display which may be a full screen region or smaller, and represents a bordered region, typically of a rectangular shape, and to which displayed data from application programs are written. Multiple windows may be utilized to permit the screen of the system display device to be partitioned into separate or overlapping windows, each of which may be assigned to view and/or control the activities of the same or different applications.

Border generation for windows in the prior art is relatively simple with simple lines or filled rectangular regions forming the borders for prior art windows. Thus, the system processor simply generates uniform lines or filled bars of the required length to create window borders. With the advent of high resolution color monitors and multi-media systems, such window borders do not make full use of the system capabilities and do not provide window border images with realistic, simulated three-dimensional (3-D) appearance of real border or frame materials. Further, realistic, real material border images cannot be generated for windows of a wide range of dimensions with the prior art technique because of the need to provide continuous real features such as shading, reflection and other 3-D effects, wood grain, etc.

It is accordingly an object of this invention to provide a method and apparatus to generate realistic, simulated 3-D window borders with the appearance of real framing material such as wood, stone, etc., within a windowing display environment.

It is another object of the invention to provide a method and apparatus for generating a realistic window border for any size window with integral realistic user controls.

Briefly, according to one embodiment of the invention, realistic window border generation methods and apparatus are provided for generation of realistic window borders having the appearance of real 3-D frame material. Apparatus including a programmed processor for generating realistic window borders on a display screen in a windowing environment is provided which include means for input of a plurality of realistic pictorial frame elements and for storing the realistic pictorial elements. In addition, means for determining a selected size of the window is determined and element dimensions are determined for each frame element based upon the selected size of the window. Location information for each frame element is determined based on the selected size. The frame elements are retrieved from storage and sized frame elements are generated based upon the element dimensions. A window border image of the selected size is then assembled and displayed on the display screen.

BRIEF DESCRIPTION OF THE DRAWINGS

The invention, together with further objects and advantages thereof, may be understood by reference to the following description taken in conjunction with the accompanying drawings.

FIGS. 3A and 3B are expanded illustrations of specific embodiments of a realistic window border depicting, respectively, a wood frame and a stone frame in accordance with the invention.

FIGS. 5A-5V are illustrations of various pictorial elements utilized to generate the specific embodiment of the window border illustrated in FIG. 3B in accordance with the invention.

FIGS. 6A and 6B are flow diagrams illustrating the methodology and structural flow of a specific embodiment of a window border generation routine which can be used to practice the invention.

DETAILED DESCRIPTION OF THE PREFERRED EMBODIMENT

Figure 1:
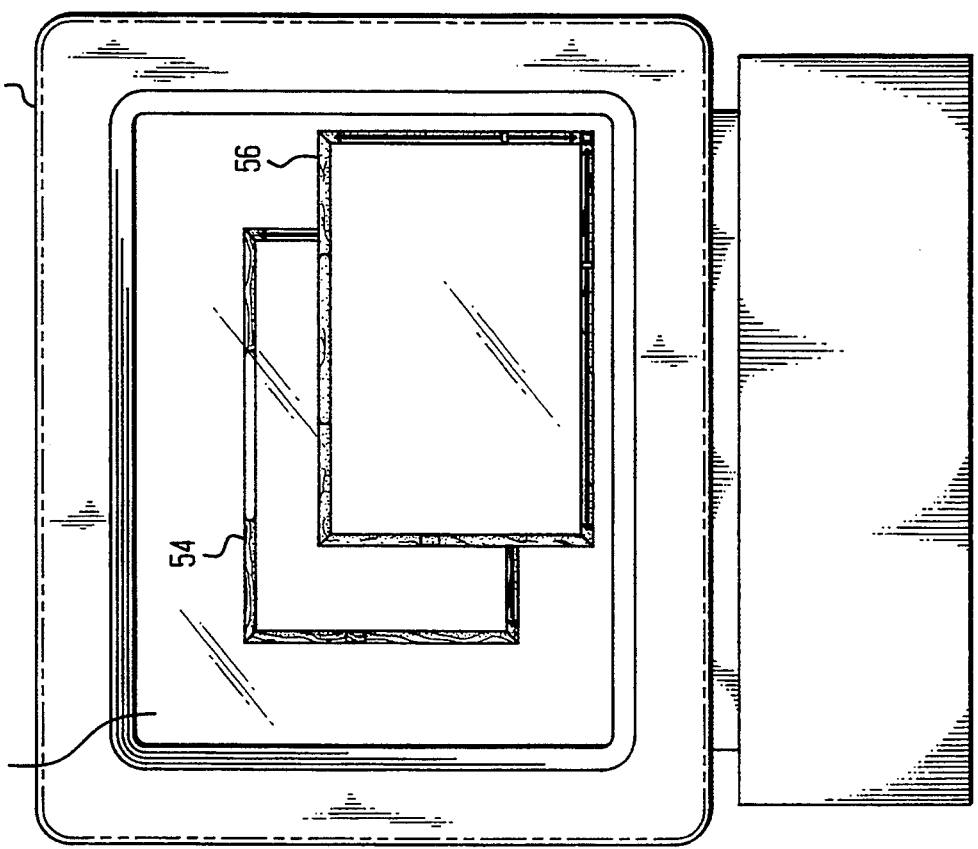
FIG. 1 is an illustration of a display monitor with two windows displayed on a screen in accordance with the invention.

FIG. 1 is an illustration of the front of a display monitor 50 having a display screen 52 as it would appear with two overlapping windows 54, 56 displayed in accordance with the invention. In the illustrated embodiment, as many windows as available memory permits may be defined anywhere on the screen with different and independent work processes or images typically associated with each window. The display monitor 50 may be a conventional LCD display, a CRT screen, or any other suitable display device for providing alphanumeric and graphic display capabilities.

Figure 2:
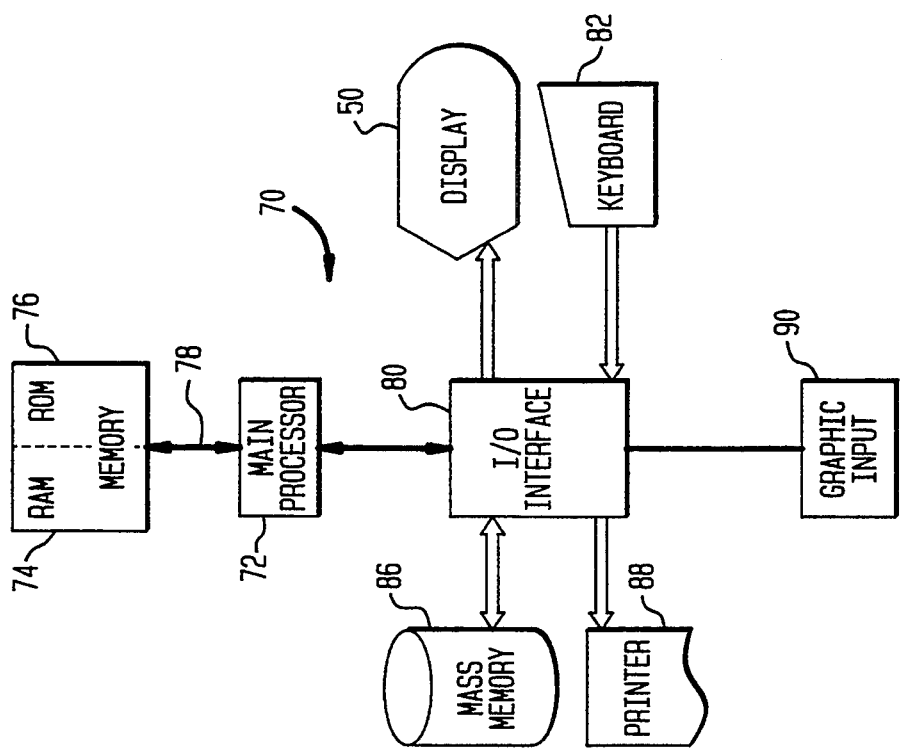
FIG. 2 is a block diagram illustrating the structure of a specific embodiment of a computer system in accordance with the invention.

FIG. 2 illustrates typical apparatus 70 (e.g., a microcomputer system) for practicing the invention including a main data processor 72 (e.g., an Intel 80386 or a Motorola 68030) with volatile random access memory (RAM) 74, and read only memory (ROM) 76 coupled to the processor 72 by a bus 78 for use, for example, as operating memory, as a screen buffer, etc. An input/output (I/O) interface 80 couples a keyboard 82, the display monitor 50 and peripherals such as mass memory 86 (e.g., a conventional hard disk, optical disk, magnetic tape unit, etc.) and graphic input devices 90 (e.g., a mouse, a digitizer tablet, a light pen, etc.), a printer 88 (e.g., a LaserWriter marketed by Apple Computer Corp.) to the main processor 72. Additional peripheral devices such as a coprocessor, communications link, image digitizer, etc., may also be coupled to the processor 72 via the I/O interface 80 for use in conjunction with the invention. The apparatus 70 may, for example, comprise any of a wide variety of conventional computer systems, including, but not limited to, a PS/2 Model 70 Personal Computer marketed by IBM Corporation, an IBM AT Compatible Personal Computer such as that marketed by Compaq Computer Corp., or a Macintosh II Computer marketed by Apple Computer Corp. It is also contemplated that the invention could be practiced with a mini computer system, a main frame computer system, or a dedicated discrete digital system. The apparatus 70 includes instructions in the form of programs stored in memory which enable the system to perform a variety of functions to generate the realistic window borders.

Figure 3B:
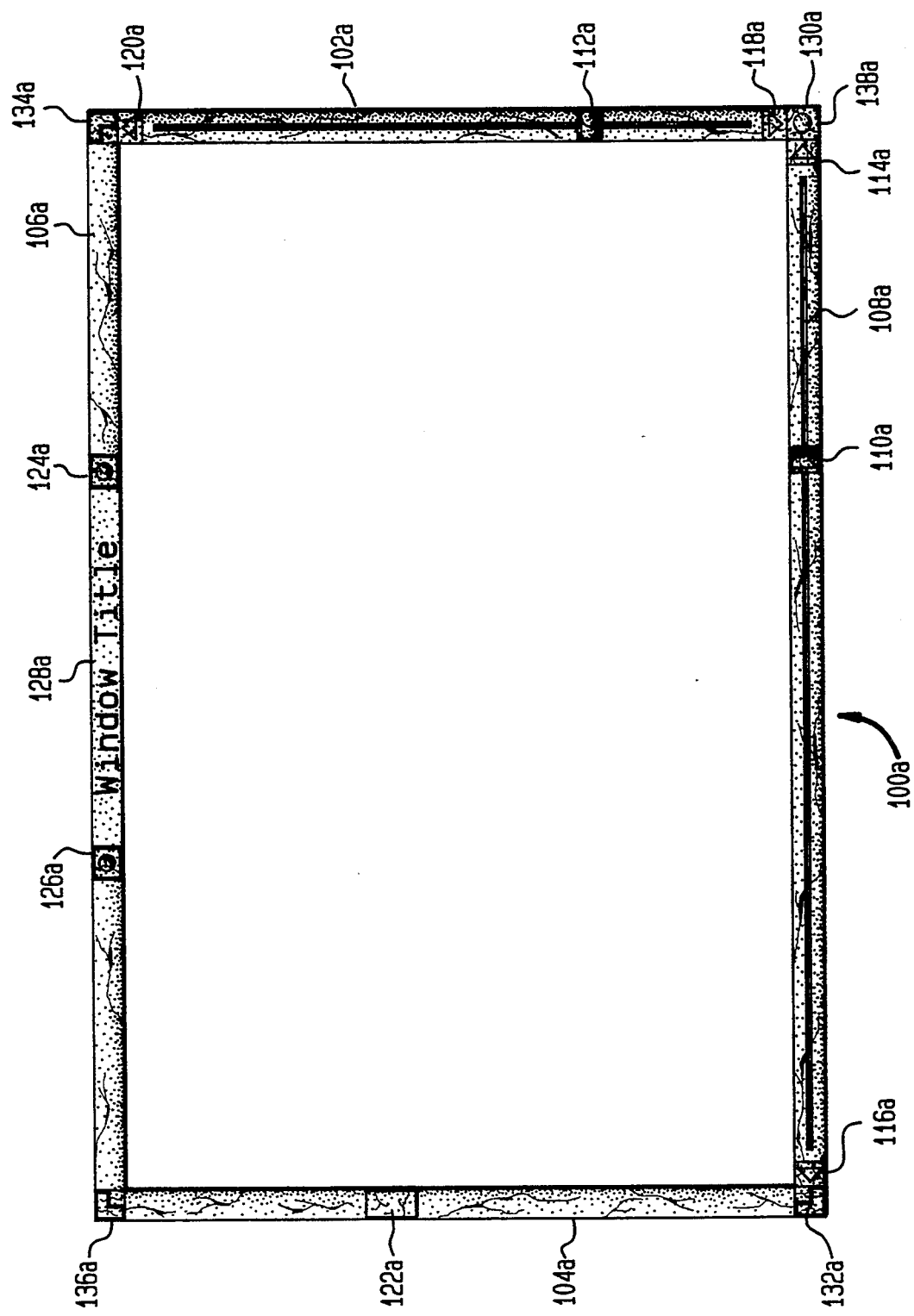

FIG. 3A is an expanded illustration of a specific embodiment of a realistic wood frame window border 100 simulating a wood picture frame. The window border 100 is composed of a set of pictorial elements including a right shaft 102 (alternatively, a right bar 103), a left bar 104, a top bar 106, and a bottom shaft 108 (alternatively, a bottom bar 109). Additional pictorial elements include the following: a horizontal elevator control 110; a vertical elevator control 112; a right arrow 114; a left arrow 116; a down arrow 118; an up arrow 120; a close button 122: a title right end 124; a title left end 126; a title bar 128: a bottom right end 130; a bottom left end 132; a top right end 134; a top left end 136; and a grow button 138. In the illustrated embodiment, the horizontal and vertical elevator controls 110, 112; the right, left, down, and up arrows 114, 116, 118, 120; the close control 122; and the grow indicator 138 may be displayed in two forms—active and inactive. For example, one color, intensity or image may be used for the active status and another color, intensity or a different image for the inactive status. FIG. 3B illustrates another embodiment showing a realistic appearing stone frame window border 100a with elements corresponding to FIG. 3A designated by the same reference numerals with an associated reference character "a". In accordance with the invention, any realistic window frame structure, of which FIGS. 3A and 3B are examples, may be used.

Referring now to FIGS. 4A-4V, each of the pictorial frame elements 102-138 for the wood frame window border 100 are shown separately. In the illustrated embodiment, each frame element 102-138 is input into the apparatus 70 and stored in memory in the largest size that will be required. The system may also store shorter repeatable segments. Alternatively, a standardized size element may be stored and then increased or decreased in size by using a bit mapped scaling operation. This process is typically performed by an artist who generates the desired frame elements in realistic form including real effects such as grain, texture, color variations, etc., and simulated 3-D characteristics such as reflection, shading, etc. using a drawing program (e.g., the "Studio 8" drawing program marketed by Electronics Arts, Inc.) in an appropriate apparatus 70 (e.g., Macintosh II marketed by Apple Computer Corp.). These images may be created using other methods as well such as using an independent computer graphics systems or digitizing a video image. The frame elements are then stored for later retrieval to permit sizing, locating, and displaying operations when display is desired. In the illustrated embodiment, each frame element is stored as a bit mapped graphical image, however, use of other formats is also contemplated. Each frame element 102-138 is depicted with realistic characteristics so as to resemble a real, 3-D structure. Typically, the frame elements 102-138 are displayed on a color monitor and include full color attributes.

Figure 4R:
FIGS. 4A-4V are illustrations of various pictorial elements utilized to generate the specific embodiment of the window border illustrated in FIG. 3A in accordance with the invention.
Figure 4R:
Figure 4R:
Figure 4R:
Figure 4R:
Figure 4R:
Figure 4R:
Figure 4B:

FIG. 4A illustrates the right shaft element 102 which is depiction of a 3-D wood side piece of the window border 100 with a groove 101 in which the vertical elevator 112 slides, and FIG. 4B illustrates the similar bottom shaft element 108 with a slide groove 107 for the horizontal elevator 110. FIG. 4C illustrates the right wood bar 103 and FIG. 4D illustrates the bottom wood bar 109. Each bar 103, 109 is a depiction of a 3-D wood edge piece without a groove which in practice is typically drawn first after which elements 102 and 108 may be respectively drawn over at least a portion of the respective bar 103, 109 when the vertical and horizontal elevators are desired. FIG. 4E illustrates the left wood bar 104 and FIG. 4F illustrates the top wood bar 106. Each of these frame elements is input and stored in the memory of apparatus 70 (e.g., typically mass storage such as the disk drive but alternatively in ROM, RAM, etc.) for subsequent retrieval, sizing and display. In the illustrated embodiment, these frame elements are stored in the largest size that will be required (e.g., typically somewhat longer than the full width or height of the display) for display and are then reduced in size by clipping of part of the length of the element for display of smaller windows.

For example, for a typical display 50 with a horizontal resolution of 640 pixels, and a vertical resolution of 480 pixels, the stored right shaft 102, right bar 103, and left bar 104 (i.e., the vertical elements) images could have a length of 600 pixels and the stored top bar 106, title bar 128, bottom bar 109 and bottom shaft 108 (i.e., the horizontal elements) images could have a length of 800 pixels. This would permit generation of a window larger than the screen viewing area. To generate smaller windows requiring shorter elements, the various elements are reduced in size in the illustrated embodiment by clipping (truncating) the stored bit mapped images off the right, or bottom.

In an alternative embodiment, the pictorial elements may be changed in size to fit the desired window size by means of a graphic bit mapped scaling operation. In the scaling operation, an element is reduced in size by removing pixels or combining (e.g., blending together) adjacent pixels throughout the length of the element (e.g., every four pixels removed or averaged into the adjacent pixels). This removal of pixels on a distributed basis throughout the length of the element permits shortening an element as desired. Similarly, an element can be lengthened by adding pixels on a distributed basis (e.g., duplicating every four pixels, etc.). This alternative graphic scaling technique can permit use of smaller pictorial elements and thus reduce memory requirements.

FIG. 4G illustrates the horizontal elevator control 110 and FIG. 4H illustrates the vertical elevator control 112 which are depictions simulating a 3-D slide control knob for indicating user control of the horizontal and vertical position of the image data to be displayed within the window. Typically, these slide controls are moved by the user during operation of an application program in the windowing environment using, for example, a mouse. This is done by activating the slide indicator by clicking the mouse on it and then dragging it to the desired position with the mouse. Each slide element has two forms, active and inactive, with, for example, a different color, intensity or image for each of the two forms. FIG. 4I illustrates the right arrow 114, FIG. 4J illustrates the left arrow 116, FIG. 4K illustrates the down arrow 118, and FIG. 4L illustrates the up arrow 120. Each of these arrow indicia in the illustrated embodiment provides to the user a control indicia for controlling scrolling of the image in the window in the indicated direction. For example, the arrow elements 114–120 are first activated by clicking the mouse on the desired arrow and then holding to generate continuous scrolling in the conventional manner. In the illustrated embodiment, the arrow is brighter or a different color for active status. In another embodiment, the arrow for the active status may be a slightly different image, for example, the image of a larger arrow or the image of a depressed arrow shaped button to give the appearance to the user of having pushed the button when the mouse is clicked on it.

FIG. 4M illustrates a close control button 122, and FIG. 4N illustrates a grow button 138. These two control buttons are used, in the illustrated embodiment, to permit closing the window by, for example, clicking the mouse on the close button, and to permit increasing the size of the window by clicking the mouse on the grow button and dragging. In the activated status, these indicia are brighter or a different color from that for the inactive status in the illustrated embodiment. In another embodiment, these buttons may be different images for active status, for example, the image of a depressed button may be displayed when activated to give the appearance to the user of having pushed the button when the user activates it.

All of the above control indicators have both an active and an inactive form. In addition, each is depicted with realistic, 3-D characteristics so as to resemble a real 3-D button, knob, etc. It is contemplated that each of these control indicators may be located at any desired location on or off the border in addition to the locations shown in the illustrated embodiment. Further, these and other control indicia may optionally be included or excluded as required for the windowing environment in which the invention is used.

FIG. 4P illustrates the title bar right end 124, FIG. 4Q illustrates the title bar left end 126, and FIG. 4R illustrates the title bar 128 which are utilized together to generate a title bar as shown in FIG. 3A and 3B. The full title bar is generated by generating the desired length of the title bar 128 and then adding the right and left title bar ends 124, 126 to the appropriate end of title bar 128. In addition, alphanumeric characters are typically added to the title bar to provide a title or other information for the window. FIG. 4F illustrates the bottom right end 130; FIG. 4T illustrates the bottom left end 132; FIG. 4U illustrates the top right end 134; and FIG. 4B illustrates the top left end 136. These end elements are used to fill in the right angle corners of a rectangular window.

FIGS. 5A–V separately illustrate each of the pictorial frame elements 102a–138a for the stone frame window border 100a with elements corresponding to those of FIGS. 4A–V designated by the same reference numerals with an associated reference character "a".

Although the illustrated embodiment utilizes a rectangular window, it is intended that the invention may be practiced utilizing any other desired shapes of windows including rectangular with rounded corners, rectangular with non-straight sides, circular, elliptical, triangular, etc. While a color display provides the greatest realism, it is also contemplated that the invention be practiced with a monochrome display as well.

Window border generation, in general, is activated by windowing software such as an operating system with a windowing environment or an application program. The windowing software defines the window (i.e., location, size, title, etc.) and then utilizes the window border generation method according to the invention to generate the window border. The window generation method utilizes the window definition information to calculate the dimensions and location of each pictorial frame element. As these parameters are determined for each frame element, the bit mapped image of each element is retrieved and sized (i.e., truncated or scaled) based on the calculated dimensions and drawn to a screen buffer (or alternatively directly to the screen) to assemble a complete window border image. This assembled image is then written to the screen for display. If multiple, overlapping windows are displayed, frame elements which will be completely obscured by an overlapping window may be ignored to save the computation and drawing time for those elements. Obscured sections of an overlapped window are defined by the controlling windowing software in the conventional manner. Generation of the obscured sections may then be inhibited so that they are not generated and not drawn to the screen buffer.

FIG. 6A is a detailed flow diagram illustrating a methodology and structural flow of a specific embodiment of a window border generation routine for the illustrated embodiment of FIG. 3A in a windowing environment according to the invention. The routine begins at block 200 with start up and initialization. This entry point 200 is typically reached after the operating system or application software have defined the text for the title bar, the window location (i.e., absolute x, y coordinates Bx andBy) and the window space (i.e., width, Bw and height Bh) and has called the window generation routine to generate a window border at the defined location and within the defined window space. The method of window border generation then proceeds, as illustrated by block 202 with retrieval of the window position and boundary information which includes the absolute x and y coordinate position, Bx and By, (measured from the zero coordinates at the top left of the screen 52) with the coordinates identifying the top left position on the screen of the window rectangle. The size of the window rectangle (i.e., its boundaries) is also determined by a width value Bw and a height value Bh, as shown. The position values are ultimately used to determine the absolute coordinates of each frame element of the window border.

The relative location coordinates Lx and Ly for the top left end are determined, as shown by block 204, by setting Lx=0 and Ly=0. This references the top left corner of the top left end element 136 to the top left corner the window. The width of the corner rectangle (Lw) is set equal to the smaller of Bw and the width (Lw) of the top left end 136, and the height is set equal to the smaller of Bh and the height of the top left end 136, as shown by block 204. Thus, the size of the top left corner element 136 is either its standard size as stored in memory or smaller if the window space available is smaller than the size of the stored top left end 136. The top left end frame element 136 is then drawn, as indicated by block 206, by retrieving the bit mapped image of the top left end element 136 from memory and copying the bits of that image to the screen buffer at the calculated relative location. Alternatively, the image bit map may be copied directly onto the screen which requires immediate conversion of the location coordinate to absolute screen coordinates. The calculated size information is used to clip the element 136 bit mapped image off the right and bottom ends to fit it into the rectangle defined by the calculated size data if the calculated dimensions are smaller than the dimensions of the stored element bit map image (or alternatively using graphic scaling). In one embodiment, for all elements, if the window definition information indicates an element location will be obscured by an overlapping window or other image, generation of that element is inhibited.

The location and size data for the top right end element 134 and top bar element 106 are then calculated as indicated by block 208. The top right end 134 coordinates are determined by subtracting the width of the stored top right end element 134 from the window width Bw to obtain the x coordinate, and using zero for the y coordinate. The width and height value are the smaller of the top right end element 134 dimensions and the window dimensions. The coordinates for the top bar 20 element 106 are determined by the width of the top left corner element for the x coordinate, and zero for the y coordinate. The dimensions of the top bar will be the height of the stored bit mapped image and the length is the width Bw minus the sum of the width of the top left end element 136 and the top right end element 134. As indicated by the block 210 and the return path 211, the calculated elements are drawn to the screen buffer as each respective element's location and size data are determined. Thus, the top right end element 136 values are calculated and the bit mapped image data are retrieved and drawn into the calculated location in the screen buffer, as shown at block 210. The routine then returns to block 208 and the top bar element 106 location and size data are determined after which the bit mapped image data is written to the calculated region of the screen buffer as indicated at block 210. If, for example, the top bar bit mapped image must be shortened to fit into allocated space, the image is scaled, or clipped off on one end (i.e., truncated, on the right in the illustrated embodiment). If the height of an element must be reduced to fit into allotted space, the image is clipped from the bottom or reduced by graphic scaling in the illustrated embodiment.

After the top bar element 106 is drawn, processing control proceeds from block 210 to the calculation and drawing to the screen buffer of the title bar 128, then the title left end 126 and then the title right end 124 as illustrated by blocks 212 and 214. The title bar element 128 location coordinates are determined similar to the method described hereinbefore. The title bar element 128 is centered over the top bar element 106 with a length determined by the shorter of the length needed for the text to be put in the title bar and the available amount of the window width. The text is forced to the left end of the title bar if there is not enough length available for all the text, with the excess text truncated on the right. In calculating the location and dimension data for the title bar and title ends, in the illustrated embodiment, space for the title end elements 124, 126 is provided by substracting the necessary length for the end elements from the title bar. Thus, the title bar length will be the smaller of the length of the title text and the window width minus the width of the two top end elements 134, 136 and the width of the two title end elements 124, 126. Excess length of the stored title bar image is also truncated off the right or scaled when the title bar is drawn to the screen buffer. The title bar 106 and the title are drawn to the calculated screen buffer location when the calculations are completed, after which the title left end location data are calculated and the title left end is drawn to the screen buffer. The title right end location data are then similarly determined and the title right end element is drawn to the screen buffer as illustrated by block 210.

As indicated by the node 216, processing flow continues to block 218 of FIG. 6B from block 214 of FIG. 6A where location and dimension values for the bottom left end 132, the left bar 104 and the close button 122 elements are determined. The bottom left end and left bar elements coordinates are determined similarly to the top right end and top bar coordinates with the x coordinate equal to zero and the y coordinates determined by By and the height of the top left and bottom left end elements. The close button 122, which can be optional depending on the requirements of the application, may be drawn in the illustrated embodiment with a predetermined size and location (e.g., one third of the way down the left bar with size as stored or smaller if the window height is less than the height of the button) on the left bar 104. Location and size data for each element is calculated in the order shown in block 218 and the image data for each element is drawn to the screen buffer in turn, as indicated by block 220.

After the close button is drawn, the size and location data for each of the elements for the bottom of the window rectangle are then respectively calculated as illustrated by block 222. As each set of data is calculated, it is used to draw the image data to the screen buffer as shown at block 224 in the order shown in block 222. The calculations for location and dimension are performed similar to those previously described with the grow button 138 located at the right bottom corner (i.e., Lx=Bw—width of the grow button; Ly=Bh—height of the grow button). If a grow button is not used in the application, then the bottom right end element 130 is used. The left arrow 116 is located immediately next to the left bottom corner (i.e., Lx=width of bottom left end) and the right arrow is located immediately next to the right bottom corner (i.e., Lx=Bw—width of grow button—width of right arrow). These arrows are drawn over the bottom bar. The bottom shaft is drawn, typically centered, over the bottom bar 109 and the horizontal elevator 110 is drawn over the bottom shaft 108 image data at a selected location (e.g., one third of distance from right end).

After the horizontal elevator 110 has been drawn to the screen buffer at block 224, the process flow continues to blocks 226 and 228 where the location and dimension data for each of the elements for the right side of the window border are respectively calculated and used to draw the respective element to the screen buffer. The location and dimension calculations are performed substantially as previously described, with the up arrow 120 drawn over the right bar 103 at the top next to the top right end 134 and the down arrow drawn over the right bar 103 at the bottom next to the grow button 138. The right shaft 102 is drawn centered over the right bar 103 in the illustrated embodiment and the vertical elevator 112 is drawn over the right shaft 102.

After the vertical elevator 112 is drawn to the screen buffer, the screen buffer is written to the screen by converting the location coordinates to absolute screen coordinates (i.e., by adding Bx, By to Lx and Ly) and then drawing the window border, which has been assembled in the screen buffer, onto the display screen at the calculated absolute screen coordinates, as illustrated by block 230. The routine is then exited to return to the calling application as illustrated by block 232.

Specific embodiments of the novel window border, method, and apparatus, had been described for the purpose of illustrating the manner in which the invention may be made and used. It should be understood that implementation of other variations and modifications of the invention in its various aspects will be apparent to those skilled in the art and that the invention is not limited thereto by the specific embodiments described. It is therefore contemplated to cover by the present invention any and all modifications, variations, or equivalents that fall within the true spirit and scope of the underlying principals disclosed and claimed herein.

What is claimed is:

1. A method for displaying a window border frame, comprising custom designed pictorial frame elements, for a window on a display screen in a windowing environment, comprising the steps of:
   creating, using a computer program for developing customized drawings under a control of a user, the pictorial frame elements having an arbitrary pictorial design;
   storing the pictorial frame elements in computer memory;
   determining a size and location of a window border frame of an existing window in the windowing environment,
   retrieving the stored pictorial frame elements from the computer memory,
   modifying the pictorial frame elements such that the elements are sized to fit within the window border frame, and
   displaying the window with the pictorial frame elements assembled in the window border frame.

2. The method of claim 1 wherein the created pictorial frame elements represent 3-D objects.

3. The method of claim 1 wherein the pictorial frame elements are stored as bit mapped images.

4. The method of claim 3 wherein the step of modifying the pictorial frame elements comprises the step of truncating the bit mapped images to reduce the size of the frame elements.

5. The method of claim 1 wherein the step of displaying comprises the step of drawing each frame element into a screen buffer location based upon the location information determined in the determining step to provide a complete window border image stored in the screen buffer.

6. The method of claim 5 further comprising the step of drawing the complete window border image stored in the screen buffer onto a display screen for display.

7. The method of claim 5 wherein said complete window border image has a non-rectangular shape.

8. The method of claim 1 further comprising the step of inhibiting display of frame elements having a location which will be obscured by an overlapping image.

9. The method of claim 1 wherein the step of modifying the pictorial frame elements further comprises the step of performing graphic scaling to modify the size of frame elements.

10. The method of claim 1 wherein the pictorial frame elements are created and stored in a size corresponding to a largest size of a window in the windowing environment.

11. The method of claim 1 wherein at least one of the pictorial frame elements is created by digitizing of a video image.

12. The method of claim 1 wherein the pictorial frame elements represent at least two different designs.

13. An apparatus for displaying pictorial frame elements in a window border frame for a window on a display screen in a windowing environment comprising:
   means for storing the pictorial frame elements having a pictorial design created using a computer program for developing customized drawings under a control of a user;
   means for determining the size and location of a window border frame of an existing window in the windowing environment;
   means for retrieving the pictorial frame elements from the storing means;
   means for modifying the pictorial frame elements such that the elements are sized to fit within the window border frame; and
   means for displaying the window with the pictorial frame elements assembled in the window border frame.

* * * * *